(12) United States Patent
Ger

(10) Patent No.: US 9,109,837 B2
(45) Date of Patent: Aug. 18, 2015

(54) SYSTEM FOR SUBSTANCE SEPARATION AND ENERGY RECOVERY BY THERMAL TREATMENT

(71) Applicant: Taiwan Clean Energy Technology Co., Ltd, Taichung (TW)

(72) Inventor: Jia-Shyan Ger, Taoyuan County (TW)

(73) Assignee: Taiwan Clean Energy Technology Co., Ltd., Taichung (TW)

( * ) Notice: Subject to any disclaimer, the term of this patent is extended or adjusted under 35 U.S.C. 154(b) by 223 days.

(21) Appl. No.: 13/776,800

(22) Filed: Feb. 26, 2013

(65) Prior Publication Data
US 2013/0230815 A1    Sep. 5, 2013

(30) Foreign Application Priority Data
Mar. 2, 2012   (TW) .............................. 101107009 A

(51) Int. Cl.
| | |
|---|---|
| C10J 3/48 | (2006.01) |
| F27D 17/00 | (2006.01) |
| C10K 1/02 | (2006.01) |
| F23G 5/027 | (2006.01) |
| F23G 5/46 | (2006.01) |
| F23G 7/00 | (2006.01) |
| C10J 3/00 | (2006.01) |
| C02F 11/06 | (2006.01) |
| C02F 11/10 | (2006.01) |
| C02F 11/12 | (2006.01) |

(52) U.S. Cl.
CPC .............. *F27D 17/004* (2013.01); *C02F 11/06* (2013.01); *C02F 11/10* (2013.01); *C10J 3/00* (2013.01); *C10K 1/02* (2013.01); *F23G 5/027* (2013.01); *F23G 5/46* (2013.01); *F23G 7/001* (2013.01); *C02F 11/12* (2013.01); *C10J 2300/0909* (2013.01); *C10J 2300/0923* (2013.01); *C10J 2300/0956* (2013.01); *C10J 2300/1606* (2013.01); *C10J 2300/1687* (2013.01); *C10J 2300/1823* (2013.01); *C10J 2300/1876* (2013.01); *F23G 2201/303* (2013.01); *F23G 2201/40* (2013.01); *F23G 2206/10* (2013.01)

(58) Field of Classification Search
CPC ................... F23K 2201/30; C10J 2300/0923; C10J 2300/1606; C10J 2300/1687
USPC ................. 432/199, 200; 122/7 R; 48/197 R; 210/635, 656, 149, 774
See application file for complete search history.

(56) References Cited

U.S. PATENT DOCUMENTS

| | | | | |
|---|---|---|---|---|
| 5,423,891 | A * | 6/1995 | Taylor ......................... | 48/197 R |
| 8,409,303 | B2 * | 4/2013 | Dickinson et al. .............. | 44/307 |
| 8,579,999 | B2 * | 11/2013 | Bullinger et al. ............... | 44/626 |
| 2011/0132577 | A1 * | 6/2011 | Kaufman ................. | 165/104.19 |
| 2012/0055157 | A1 * | 3/2012 | Gulen et al. ................. | 60/641.8 |
| 2013/0012605 | A1 * | 1/2013 | Zhou ............................. | 518/702 |

* cited by examiner

*Primary Examiner* — Gregory A Wilson
(74) *Attorney, Agent, or Firm* — Alan D. Kamrath; Kamrath IP Lawfirm, P.A.

(57) ABSTRACT

A system for substance separation and energy recovery by thermal treatment is disclosed. The system includes a thermal treatment reactor, a circulation piping, a heat exchanger, a discharge pipeline, a latent heat recovering device, a gasifier, and a combustion furnace. The substance is fed into the thermal treatment reactor for heating the treated substance so as to produces a gaseous substance by evaporation or pyrolysis. The treated substance is separated into the gaseous substance circulating between the heat exchanger and the thermal treatment reactor and a residual substance being fed into the thermal treatment reactor. The increased gaseous substance, during the circulation process, is fed into a latent heat recovery device, wherein the gaseous substance exchanges heat with a cold fluid and condenses to release latent heat, forming a liquid condensed substance and a non-condensed substance.

8 Claims, 2 Drawing Sheets

SYSTEM FOR SUBSTANCE SEPARATION AND ENERGY RECOVERY BY THERMAL TREATMENT

BACKGROUND OF THE INVENTION

1. Field of the Invention

The present invention relates to a system for a substance separation and energy recovery by thermal treatment; and more particularly, to an energy recovery system used to process low calorific value substances.

2. Description of the Related Art

Most substances with high moisture content have low calorific value. During combustion, these low calorific value substances results in low combustion temperature and air pollutants due to incomplete combustion.

Therefore, most high moisture content substances usually will be dried to remove water and increase heating value (as in the cases of coal drying or sludge drying) prior to combustion. A substance with lower moisture content helps to achieve a higher combustion temperature and better combustion stability.

The most popular drying method is hot air drying. Air is heated to a relative high temperature and is introduced to contact with the substances to be dried. Thus remove the water in the substance through evaporation.

The conventional utilization of the high moisture content and low calorific value substance as fuel has the following disadvantages: first of all, energy recovery of high moisture content substances through a direct combustion process results in incomplete combustion and air pollutants. Water in substance absorbs large amount of latent heat and evaporates to steam during combustion process. Combustion flue gas contains lots of the incondensable gases such as oxygen, nitrogen and carbon dioxide. The existing of the incondensable gases in flue gas will lower the dew point (condensation temperature of steam) of the flue gas. Therefore, the latent heat of the steam is very difficult to recover.

Most of the high moisture content substances prefer to remove their water in the substances through hot air drying prior to combustion. However, the hot air (heating media) containing incondensable gases results in low dew point of the air-steam mixture. Therefore, the latent heat absorbed by water during drying is also hard to recover.

Another disadvantage of conventional hot air drying is the substance to be dried will be oxidized and even catch fire due to the existing of oxygen. Thus, fire prevention equipments are necessary or lower the hot air temperature to reduce the chance of catching fire.

Furthermore, conventional hot air drying will produce large amount of pollutants such as dioxins and odors. Post treatments of the exhaust gases are required before discharging to ambient.

SUMMARY OF THE INVENTION

A primary object of the present invention is to provide a system for a substance separation and energy recovery by thermal treatment. The system of the present invention includes a thermal treatment reactor, a circulation piping, a heat exchanger, a discharge piping, a latent heat recovering device, a gasifier, and a combustion furnace, wherein the thermal treatment of the substance proceeds and is reacted inside a closed system.

The substance to be thermally treated is fed into the thermal treatment reactor, and a high-temperature gaseous heating medium is introduced into the reactor simultaneously. In the reactor, the substance to be treated increases its temperature through direct contact with the gaseous heating medium. The substance to be treated will generates a gaseous substance and a residual substance, wherein the gaseous substance is used as a heating medium and fed into the heat exchanger via a circulation fan through the circulation piping to be heated and then fed again into the thermal treatment reactor.

The substance in the thermal treatment reactor forms a gaseous substance and a residual substance because of being heated, wherein the gaseous substance has the same compositions as the high-temperature heating medium fed into the thermal treatment reactor; therefore, the gaseous substances within the circulation piping are increased in amount. The increased amount of gaseous substances is discharged through the discharge piping to prevent the pressure from rising continuously, and the gaseous substance is transmitted through the discharge piping to the latent heat recovering device, wherein the latent heat recovering device can be an indirect heat exchanger. Inside the latent heat recovering device, the gaseous substance condenses and releases latent heat for heating cold fluids; the gaseous substance thus forms a condensed substance and a non-condensed substance after passing through the latent heat recovering device. To sum up, the substances are separated into a residual substance and a gaseous substance through thermal treatment, wherein the gaseous substance is condensed to form a condensed substance and a non-condensed substance by the latent heat recovering device, thereby achieving the objective of substance separation.

The residual substance can be a product. While the residual substance used as a fuel, it can be fed into proper equipments such as a boiler or a gasifier. In a gasifier, the residual will be gasified to syngas. The combustible syngas is then mixed with combustion air via a gas burner to complete combustion in the combustion furnace. The generated high-temperature flue gas is then used as a heat source to heat up the circulating heating media via a indirect heat exchanger. In the heat exchanger, the flue gas exchanges heat to the heating media. The heating media is then fed into the thermal treatment reactor. The remaining sensible heat of the flue gas can be recovered by other heat recovering devices, such as a boiler or an air preheater.

DETAILED DESCRIPTION OF THE PREFERRED EMBODIMENT

In order to give the examiners a better understanding of the technical scheme of the present invention, a preferred embodiment is illustrated as below.

Figure 1:
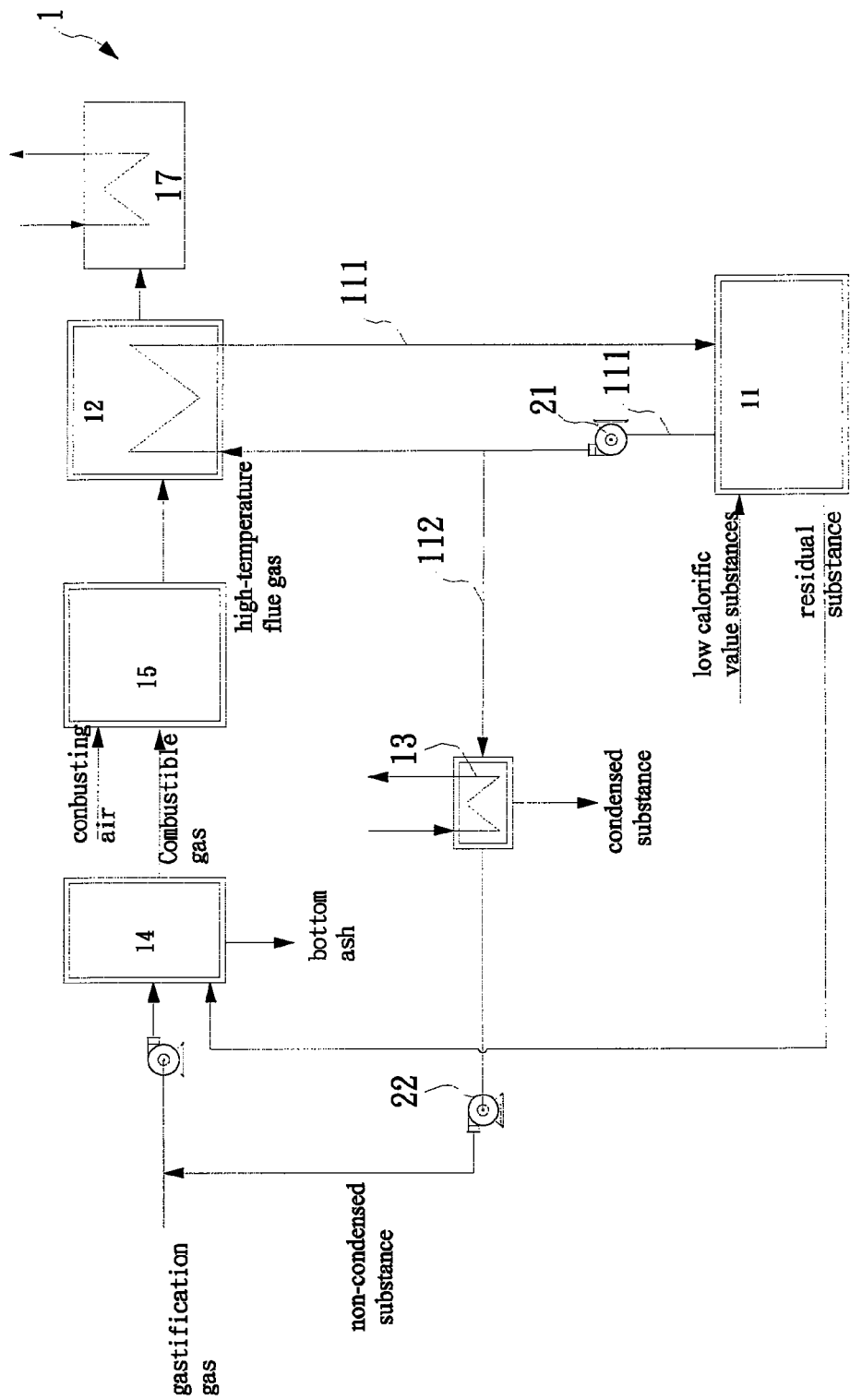
FIG. 1 is a diagram illustrating a system of the present invention with the substance separation and energy recovery by thermal treatment.

Please refer to FIG. 1; the substance separation and energy recovery system 1 of the present invention includes a thermal treatment reactor 11, a circulation piping 111, a heat exchanger 12, a discharge piping 112, a latent heat recovering device 13, a gasifier 14, and a combustion furnace 15.

First of all, the low calorific value substance is fed into the thermal treatment reactor 11. The low calorific value substance can be, such as sludge, of which the moisture content is as high as 60-80%, with a better level of humidity being 60%. The thermal treatment reactor 11 (for example, a rotary drum dryer) is used for thermal treatment such as drying, pyrolysis, or torrefaction of the low calorific value material. In the embodiment of sludge, the thermal treatment is drying. The following description uses sludge as an example of low calorific value substance for illustration.

The wet sludge with high moisture content is fed into a rotary dryer (namely the thermal treatment reactor) from an inlet of the rotary dryer and moves toward another end of the rotary dryer gradually because of the rotation and slope of a drum body of the rotary dryer. An outlet for the dried sludge is at the other end of the drum body; the inlet and outlet for the heating medium are also located at both ends of the rotary dryer to feed in and exhaust the high-temperature heating medium (in this embodiment, superheated steam) such that the high-temperature heating medium directly contacts the sludge to exchange heat. The flowing direction of the high-temperature heating medium can be the same as the direction of flow of the sludge (the inlet and outlet of the heating medium being at the same positions as the inlet and outlet of the sludge) or can be the opposite direction according to requirements.

Inside the rotary dryer, the temperature of the sludge with high moisture content (for example, 60%) rises to a boiling point (for example, the boiling point of water at 1 atmospheric pressure is 100° C.) by contacting with the high-temperature heating medium (in this embodiment, superheated steam with 400° C.), and some substances inside the sludge form a gaseous substance (the majority which is steam) and a residual substance (dried sludge with 10~30% moisture content, the better amount being 20%), and thus achieving the objective of separating the gaseous substance from the residual substance.

When the high-temperature heating medium (for example, 400° C.) contacts the sludge, the temperature decreases (for example, to 150° C.) because the heat is transferred to the sludge to evaporate water. The gaseous substance produced from the sludge in the thermal treatment reactor 11 and the heating medium with a reduced temperature are sent to the heat exchanger 12 by a circulation fan 21 through the circulation piping 111 to be heated again (for example, to be heated to 400° C.).

In the present embodiment, the amount of steam in the circulation piping 111 increases continuously because of the addition of evaporated steam from the sludge, which causes the pressure inside the circulation piping 111 to rise continuously. In the present embodiment, the increased steam (i.e. excess heating medium) passes through the discharge piping 112 to the latent heat recovering device 13, wherein a vacuum pump 22 is disposed at the end of the discharge piping 112 to provide negative pressure operation, or with a throttle valve installed for positive pressure operation; thus the pressure inside the circulation piping can be controlled so as to control the operation pressure of the thermal treatment reactor 11.

In the present embodiment, the latent heat recovering device 13 is an indirect heat exchanger that uses cold fluid (for example, 25° C. combustion air or boiler feed water) and 150° C. low-temperature superheated steam (a gaseous substance) to exchange heat and to decrease the temperature of the superheated steam. When the temperature of the steam decreases to a dew point (saturation temperature, in accordance with the operation pressure, around 100° C. for 1 atmospheric pressure), the steam will release latent heat and condense into liquid water (a condensed substance). In the present embodiment, because the majority of the discharged gaseous substance is steam, the dew point will remain unchanged when the steam condenses; thus, the latent heat, which is the greatest portion of the steam enthalpy, can be recovered at the dew point, and the cold fluid can be heated to a temperature close to the dew point (for example, 90° C.). Therefore, since the water contained in the sludge is discharged as condensed water near cold fluid inlet temperature in the end, the effective calorific value can be a higher heating value (HHV).

After the gaseous substance discharged from the discharge piping 112 passes through the latent heat recovering device 13, the temperature can be decreased to a temperature (for example, 35° C.) close to the cold fluid inlet temperature (for example, 25° C.) of the latent heat recovering device 13 under negative pressure operation. Under such temperature (for example, 35° C.), the majority of the non-condensed gas are the air which are feed into the thermal treatment reactor 11 with the sludge and the air leaks into the system from ambient. The non-condensed gas then can be fed into the gasifier 14 by the draft fan 22 to be a part of the gasification gas. When under positive pressure operation, the pressure at the end of the discharge piping 112 is almost the same as the pressure of the thermal treatment reactor 11. The pressure is depending on the condensation rate of the latent heat recovering device 13 and the evaporation rate of the thermal treatment reactor 11. When the condensation rate of the latent heat recovering device 13 is lower than the evaporation rate in the thermal treatment reactor 11, excess evaporated gaseous substance is released to other processes through the throttle valve at the end of the piping. The composition of the released non-condensed gases is almost the same with the gaseous substance evaporated in the thermal treatment reactor 11.

The dried sludge (residual substance) is fed into the gasifier 14 in the present embodiment. The majority of the gasification gas is the ambient air preheated by the latent heat recovering device 13. The non-condensed substance of the discharge piping 112 also can be fed into the gasifier as a part of the gasification gas. The non-condensed substance being mainly a low-boiling point substance like air when under negative pressure operation and being mainly steam when under positive pressure operation, both of which can be gasification gas in this embodiment.

The dried sludge is gasified into syngas (combustible materials) and ashes (non-combustible materials) under high temperature (500~1000° C.) in the gasifier 14. The gasification gas is around 20%~50% of the amount of the theoretical combustion air. The ashes are discharged from the bottom of the gasifier 14 (bottom ash) or carry over by the syngas (fly ash). The syngas mixed with combustion air are fed into the combustion furnace 15. Inside the combustion furnace 15, the syngas are burned completely and produce a high-temperature flue gas (800~1200° C.). The temperature of the flue gas can be adjusted by controlling the amount of the excess combustion air fed into the combustion furnace 15. For example, the temperature of the high-temperature flue gas is adjusted at 950° C. in the present embodiment. The sensible heat of the high-temperature flue gas discharged from the combustion furnace 15 can be recovered by the heat recovering apparatus, for example used as the hot fluid of the heat exchanger 12, and another heat recovering apparatus such as the boiler 17.

Figure 2:
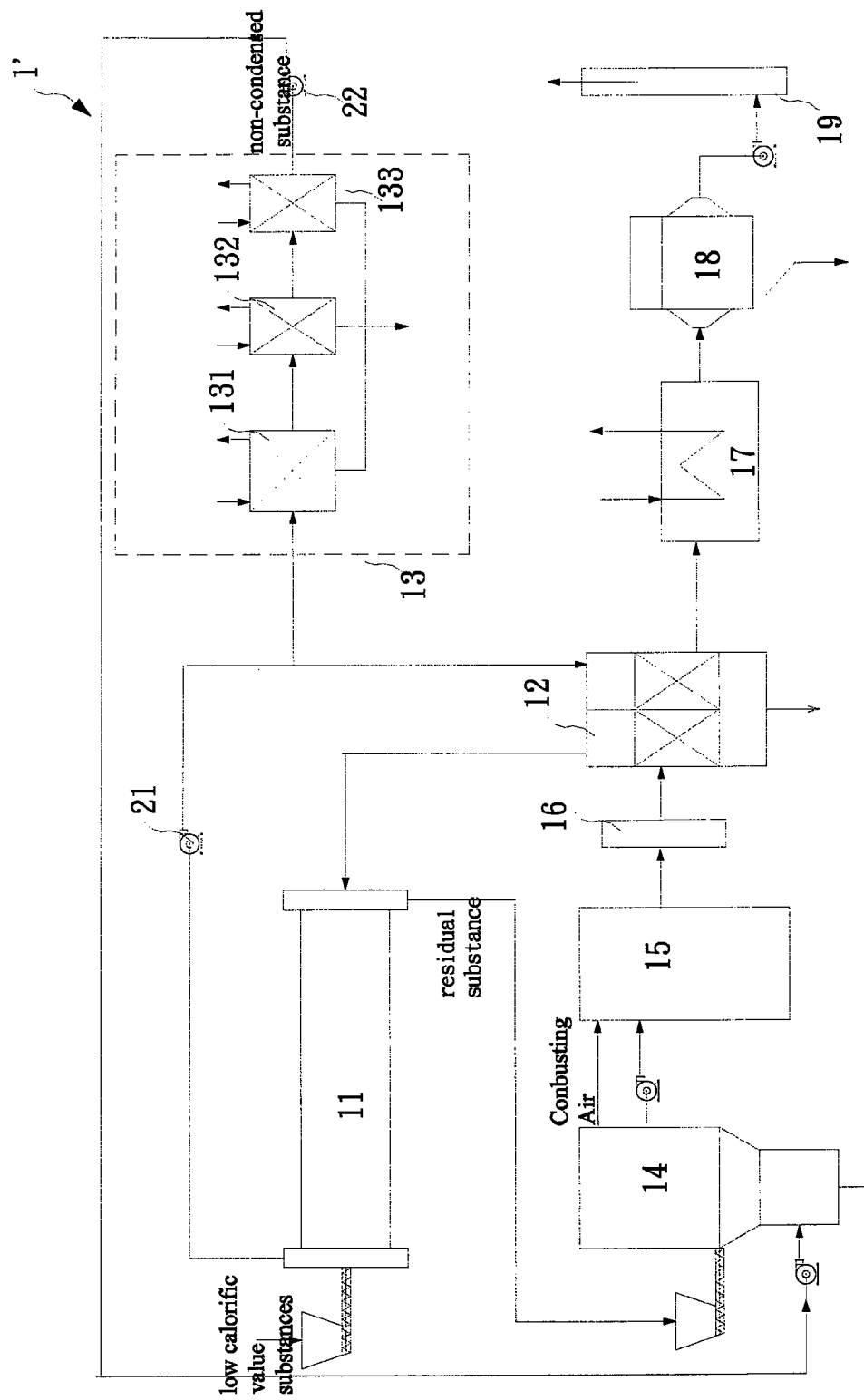
FIG. 2 is a diagram illustrating another embodiment of a system of the present invention with the substance separation and energy recovery by thermal treatment.

Please refer to FIG. 2. In a preferred embodiment of the present invention, the energy recovery system 1' further includes a first dust collector 16 (a cyclone dust collector), a boiler 17, and a second dust collector 18 (a baghouse dust collector). The high-temperature flue gas is fed into the heat exchanger 12 after most of the fly ash is collected by the first dust collector 16, and the high-temperature flue gas exchanges with the heating medium. The temperature of the high-temperature flue gas is decreased to around 650° C. after the heat exchanger 12 in the present embodiment. Another heat recovering apparatus, such as the boiler 17, can be used to recover the rest of the sensible heat of the flue gas. In the present embodiment, the boiler 17 is a saturated steam boiler with a saturated pressure of 7 Kg/cm². After the boiler 17, the flue gas temperature is decreased to 180° C. In the present embodiment, the low-temperature flue gas is discharged through the chimney 19 after the dust is removed by the second dust collector 18.

The latent heat recovering device 13 includes pre-heaters, such as the pre-heaters 131, 132, and a condenser 133, wherein the pre-heaters 131, 132 can be serially or parallelly connected, and in the present embodiment, it is serially connected; the discharged steam (gaseous substance) is introduced to the pre-heater 131 first; in the present embodiment, the pre-heater 131 is used to preheat the gasification air fed into gasifier 14 and the combustion air fed into the combustion furnace 15. Then the gaseous substance flows through the pre-heater 132; in the present embodiment, the pre-heater 132 is used to preheat feed water of the boiler 17. Finally, the excess latent heat of the steam is discharged as a non-condensed gas to the gasifier 14 after passing through the condenser 133. When the 150° C. steam flows through the pre-heater 131 for air preheating, it gradually decreases its temperature because of heat transfer to the cold fluids (air); at the same time, the temperature of the pre-heated air increases. The steam releases its latent heat in the pre-heater 131 when the steam temperature decreases to the dew point (around 100° C.). Therefore, the pre-heated air can be heated to higher than 100° C. At the meantime, the steam temperature (saturation temperature) remains almost unchanged when flowing through the pre-heater 132, which can heat the boiler's feeding water to around 90° C. The remaining saturated steam can be used to heat other cold fluid to around 90° C. (for example, ORC power generation working fluid) or be fed into a condenser 133 (air cooled or water cooled) to remove condensable substances. Thus, the temperature of the non-condensed gas discharged by the condenser 133 is a little bit higher than the temperature of the cooling water (or cooling air) fed into the condenser; in the present embodiment, the temperature of the discharged non-condensed air is in the range of 35~45° C. At this temperature, most of the moisture in the gaseous substance has been condensed and the majority of the non-condensed substance is air from the wet sludge.

In short, in the present embodiment, the wet sludge can be separated into a residual substance (dried sludge) and a gaseous substance (150° C. superheated steam) after thermal treatment, wherein the gaseous substance forms condensable substances (liquid water) after latent heat is recovered and incondensable gaseous substances which discharge to the gasifier; therefore, the present thermal treatment system will not generate any drying exhaust gases which occurs in conventional hot air drying. Furthermore, the latent heat of the water removed from the wet sludge can be recovered effectively. The recoverable energy of the wet sludge can be the higher heating value (HHV) but usually the lower heating value (LHV) of the sludge. The produced dried sludge in the present embodiment is used as fuel to dry the wet sludge and to generate steam (boiler 17).

Although the abovementioned embodiment uses drying of sludge as an example, the present invention is not confined to this application. The low calorific value substance can be any kind of combustible materials, such as municipal solid waste (MSW) or biomass. Besides drying, the present invention can also be used for torrefaction of a substance, including baking foods such as coffee beans and tea, and for torrefying fuels such as wood, MSW, etc. (mainly for products that are the residual substance of the thermal treatment). Moreover, we can also use the present invention to pyrolysis materials due to zero oxygen in the thermal treatment reactor 11, such as the pyrolysis of plastic, biomass, MSW or any kind of organic materials to produce solid/liquid fuel (residual substance of thermal treatment reactor 11), liquid fuel (the condensed substance of latent heat recovering device 13) and gaseous fuel (the incondensable substance discharge from latent heat recovering device 13).

As the procedure of the thermal treatment for substance separation of the present invention is substantially inside a closed system, it therefore does not discharge a gaseous substance as occurs in conventional air drying. Furthermore, since the heating medium itself is the gaseous substance generated from the substance treated in the thermal treatment reactor 11. Counter current flow of the substance to be treated and the heating media is possible. The substance to be treated can achieve a higher temperature without catching fire. Therefore, this method and system can be used not only for material drying but also for material pyrolysis and material torrefaction by simply adjusting the heating media temperature fed into the thermal treatment reactor.

To sum up, the present invention has characteristics that are different from the prior arts in terms of the objects, means, and function. What should be noted is that the abovementioned embodiments are provided for illustration only and not for the purpose of limiting the scope of the invention as defined by the appended claims.

What is claimed is:

1. A system for substance separation and energy recovery by thermal treatment, comprising:

a thermal treatment reactor for receiving a substance and conducting thermal treatment of the substance;

a circulation piping;

a heat exchanger, wherein the thermally treated substance produces a gaseous substance being transmitted to the heat exchanger through the circulation piping for the gaseous substance to undergo heat exchange with a high-temperature heat source to increase the temperature, the gaseous substance is then fed into the thermal treatment reactor after the temperature is increased, and then is circulated between the heat exchanger and the thermal treatment reactor through the circulation piping, and the thermally treated substance further forms a residual substance;

a discharge piping disposed with a vacuum pump and/or a throttle valve at one end thereon;

a latent heat recovering device, wherein the gaseous substance produced by the thermally treated substance is transmitted to the latent heat recovering device through the discharge piping, and the latent heat recovering device condenses the gaseous substance to condensed substance and recovers the latent heat of the gaseous substance, wherein the condensed gaseous substance forms a condensed substance and a non-condensed substance;

a gasifier, wherein the residual substance and the non-condensed substance are transmitted to the gasifier to produce a syngas; and a combustion furnace, wherein the syngas is burned in the combustion furnace with introducing combustion air to produce a high-temperature flue gas that provides the heat required by the heat exchanger;

whereby the pressure inside the circulation piping can be controlled by the operation of the vacuum pump and/or the throttle valve at the end of the discharge piping, wherein the gaseous substance produced by the thermally treated substance is increased inside the circulation piping and the pressure inside the circulation piping is increased accordingly, and the amount of increased gaseous substance is flowed and fed into the latent heat recovering device through the discharge piping.

2. The system as claimed in claim 1 further including a first dust collector, wherein the dust in the high-temperature flue gas is removed by the dust collector first and then the high-temperature flue gas provides the heat required by the heat exchanger.

3. The system as claimed in claim 1 further including a boiler, wherein the high-temperature flue gas generates a low-temperature flue gas after providing the heat required by the heat exchanger, and the low-temperature flue gas further provides the heat required by the boiler.

4. The system as claimed in claim 3 further including a second dust collector; the low-temperature flue gas is cleaned of fly ash by the second dust collector after providing the heat required by the boiler.

5. The system as claimed in claim 1, wherein the latent heat recovering device includes at least one heat exchanger (pre-heater), and the recovered heat of the gaseous substance is used for heating the at least one pre-heater.

6. The system as claimed in claim 5, wherein the latent heat recovering device includes a condenser, and the condenser condenses the gaseous substance, forming a condensed substance and a non-condensed substance.

7. The system as claimed in claim 1, wherein the thermally treated gaseous substance circulates between the heat exchanger and the thermal treatment reactor through the circulation piping, such that the system is a close system substantially.

8. The system as claimed in claim 1, wherein the vacuum pump is disposed at the end of the discharge piping to provide negative pressure operation, and while the throttle valve is disposed for positive pressure operation.

* * * * *